(12) United States Patent
Choi et al.

(10) Patent No.: US 8,374,614 B2
(45) Date of Patent: Feb. 12, 2013

(54) PERMUTATION DEVICE AND METHOD HAVING IMPROVED RESOURCE GRANULARITY FOR WIRELESS COMMUNICATIONS

(75) Inventors: Jin Soo Choi, Anyang-Si (KR); Han Gyu Cho, Anyang-Si (KR); Bin Chul Ihm, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 296 days.

(21) Appl. No.: 12/496,155

(22) Filed: Jul. 1, 2009

(65) Prior Publication Data

US 2010/0009691 A1      Jan. 14, 2010

Related U.S. Application Data

(60) Provisional application No. 61/077,480, filed on Jul. 1, 2008, provisional application No. 61/084,264, filed on Jul. 29, 2008.

(30) Foreign Application Priority Data

May 25, 2009 (KR) ........................ 10-2009-0045467

(51) Int. Cl.
*H04W 40/00* (2009.01)
(52) U.S. Cl. ........................ 455/447; 455/451
(58) Field of Classification Search ............... 455/39, 455/95, 522, 451, 447, 450, 258, 255, 509, 455/67.7, 561; 370/344, 329, 208, 330
See application file for complete search history.

(56) References Cited

U.S. PATENT DOCUMENTS

| | | | |
|---|---|---|---|
| 7,952,989 B2 * | 5/2011 | Qi et al. ........................ 370/208 |
| 2005/0215251 A1 | 9/2005 | Krishnan et al. |
| 2006/0148408 A1 | 7/2006 | Cho et al. |
| 2007/0081449 A1 * | 4/2007 | Khan ............................ 370/208 |
| 2007/0293229 A1 * | 12/2007 | Khan ............................ 455/450 |
| 2008/0069031 A1 | 3/2008 | Zhang et al. |
| 2008/0101307 A1 | 5/2008 | Sindhushayana et al. |
| 2008/0212556 A1 * | 9/2008 | Heo et al. ...................... 370/344 |
| 2008/0240034 A1 * | 10/2008 | Gollamudi .................... 370/330 |
| 2009/0042581 A1 * | 2/2009 | Liu et al. ....................... 455/450 |
| 2010/0015923 A1 * | 1/2010 | Golitschek .................. 455/67.7 |
| 2010/0157913 A1 | 6/2010 | Nagata et al. |

FOREIGN PATENT DOCUMENTS

| | | |
|---|---|---|
| JP | 2008-53858 A2 | 3/2008 |
| KR | 10-2008-0050730 A | 6/2008 |
| WO | WO 2007/084862 A2 | 7/2007 |

(Continued)

OTHER PUBLICATIONS

Li et al., "UL resource block and channelization," IEEE 802.16 Broadband Wireless Access Working Group, IEEE C802.16m-08/427, May 5, 2008, 4 pages total.

(Continued)

*Primary Examiner* — Kent Chang
*Assistant Examiner* — William Lu
(74) *Attorney, Agent, or Firm* — Birch, Stewart, Kolasch & Birch, LLP (57) ABSTRACT

A device and method for permuting subcarriers in a subframe which is divided into a plurality of frequency partitions in a wireless mobile communication system is disclosed. The method includes mapping, at a mobile station, physical resource units for localized resource allocation to a frequency partition of the plurality of frequency partitions in units of N_1 number of resource units, and physical resource units for distributed resource allocation to the frequency partition in units of N_d number of resource units, N_1 being different from N_d; and spreading, at the mobile station, subcarriers of the physical resource units for distributed resource allocation across the whole distributed resource allocations.

14 Claims, 7 Drawing Sheets

FOREIGN PATENT DOCUMENTS

| WO | WO 2007/095860 A1 | 8/2007 |
| --- | --- | --- |
| WO | WO 2007/119148 A2 | 10/2007 |
| WO | WO 2008/042842 A1 | 4/2008 |

OTHER PUBLICATIONS

Lin et al., "Downlink distributed resource mapping and hopping for 802.16m," IEEE 802.16 Broadband Wireless Access Working Group, IEEE C802.16m-08_381r3, May 5, 2008, 14 pages total.

Murias, "IEEE 802.16m Amendment Working Document," IEEE 802.16 Broadband Wireless Access Working Group, IEEE 802.16m-09/0010, Jan. 29, 2009, pp. 1-44.

Part16: Air Interface for Fixed and Mobile Broadband Wireless Access Systems, Advanced Air Interface (working document), IEEE 802.16m-09/0010r1a, Mar. 31, 2009, pp. 1-135.

* cited by examiner

PERMUTATION DEVICE AND METHOD HAVING IMPROVED RESOURCE GRANULARITY FOR WIRELESS COMMUNICATIONS

CROSS-REFERENCE TO RELATED APPLICATIONS

This application claims the benefit of the Korean Patent Application No. 10-2009-0045467, filed on May 25, 2009, which is hereby incorporated by reference as if fully set forth herein.

This application also claims the benefit of U.S. Provisional Application Ser. Nos. 61/077,480, filed on Jul. 1, 2008 and 61/084,264, filed on Jul. 29, 2008, the contents of which are hereby incorporated by reference herein in their entirety.

BACKGROUND OF THE INVENTION

1. Field of the Invention

The present invention relates to a communication method and corresponding device in a wireless mobile communication system, particularly for a cellular system.

2. Discussion of the Related Art

In wireless communications, diversity gain is the increase in a signal-to-interference ratio achieved due to some diversity scheme. In other words, diversity gain represents how much the transmission power can be reduced when a diversity scheme is introduced, usually without a performance loss.

In telecommunications, a diversity scheme may relate to a method for improving the reliability of a message signal by using two or more communication channels with different characteristics. Diversity plays an important role in combating fading and co-channel interference and avoiding error bursts. The benefits achieved through diversity scheme are based on the fact that individual channels often experience different levels of fading and/or interference. Thus, multiple versions of the same signal may be transmitted and/or received and combined in the receiver to overcome fading and/or interference associated with a single signal.

Frequency diversity is a type of diversity scheme in which a signal is transferred using several frequency channels or is spread over a wide spectrum that is affected by frequency-selective fading.

In a system adopting orthogonal frequency division multiple access (OFDMA), a resource unit typically indicates a set of resource elements comprising $P_{sc}$ subcarriers by $N_{sym}$ consecutive OFDMA symbols. Resource units are usually classified into a physical resource unit (PRU) type and a logical resource unit (LRU) type. A PRU is the basic physical unit for resource allocation that comprises $P_{sc}$ consecutive subcarriers by $N_{sym}$ consecutive OFDMA symbols. A LRU is the basic logical unit for distributed and localized resource allocations. A PRU or LRU can be indexed by the frequency value of the subcarrier of the PRU or LRU.

To obtain diversity gain, resource units (RUs) in the frequency/time domain can be spread along a frequency axis by a predetermined permutation rule designed for obtaining frequency diversity gain. Permutation may be considered to be a mapping of elements of a set to other elements of the same set, i.e., exchanging (or "permuting") elements of a set. Alternatively, permutation can be regarded as an assignment operation, with the indexes of a set of the PRUs assigned to the indexes of a set of the LRUs. In some cases, each index is assigned only once.

In some schemes, a part of one or more LRUs can be used to obtain the above described diversity gain, and another part of the one or more LRUs can be used to obtain a band scheduling gain or a frequency scheduling gain. The band scheduling gain is attainable by allocating consecutive PRUs to a user equipment (UE), knowing that the frequency band corresponding to the allocated consecutive PRUs is the optimum frequency channel for the UE. Some control information, i.e., an overhead signal, may be communicated between a transmitter and a receiver to deliver the knowledge of the optimum frequency channel.

Permutation of resource units (RUs) can be performed in units of N RUs (N>=1), i.e., with a granularity of N. In some cases, if the value of N decreases, the frequency diversity gain by permutation increases, and vice versa. However, in these cases, if the value of N decreases, the amount of the control information increases, which increases system overhead. That is, the benefit in terms of frequency diversity gain may turn into a disadvantage in terms of a signaling overhead resulting from band scheduling gain. Therefore, as discovered by the present inventors, a need has arisen to balance frequency diversity gain and overhead by communicating in accordance with an optimum number N for a given communication system requirement.

SUMMARY OF THE INVENTION

According to the present invention, resource regions for localized allocation and distributed allocation can be separately reserved. As discussed above, larger granularity may be more beneficial for localized permutation when considering both signaling overhead and band scheduling gain, and smaller granularity may be more beneficial for distributed permutation when considering diversity gain. To balance these benefits, it is possible to communicate with both a first granularity value for localized permutation and a second granularity value for distributed permutation.

The technical problem to be solved by the present invention concerns how to communicate in accordance with granularity values that balance localized permutation and distributed permutation.

In an aspect of the invention, there is a method and device for wirelessly exchanging plural sets of physical resource units (PRUs) between a base station and mobile station. The method includes splitting PRUs of each of the plural sets of PRUs into a sub-band and a mini-band, the step of splitting including alternately mapping the PRUs of each of the plural sets of PRUs into the sub-band and the mini-band in units of x contiguous PRUs.

In one embodiment, a total number of PRUs in each of the plural sets of PRUs is one of 24, 48 and 96, and x=4.

The step of alternately mapping may include: mapping a first, third and fifth unit of 4 contiguous PRUs to the mini-band; and mapping a second, fourth and sixth unit of 4 contiguous PRUs to the sub-band.

The method may further include alternately mapping PRUs of the mini-band into a second mini-band.

The step of alternately mapping the PRUs of the mini-band may include: mapping a first, third, fifth, seventh, ninth and eleventh PRU of the mini-band into a first half of the second mini-band; and mapping a second, fourth, sixth, eighth, tenth and twelfth PRU of the mini-band into a second half of the second mini-band.

The method may further include: mapping at least one PRU of the second mini-band to form a first frequency partition; and mapping at least 4 PRUs of the sub-band to form a second frequency partition.

The step of mapping at least one PRU may include mapping a first 4 contiguous PRUs of the second mini-band to the first frequency partition.

The step of mapping at least 4 PRUs may include mapping a final 4 contiguous PRUs of the sub-band to the second frequency partition.

The method may be performed by a device that is either a mobile terminal or a base station.

DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings.

As briefly mentioned above, a physical resource unit (PRU) may be the basic physical unit for resource allocation that comprises $P_{sc}$ consecutive subcarriers by $N_{sym}$ consecutive OFDMA symbols. In one embodiment, $P_{sc}$ may be 18 subcarriers and $N_{sym}$ may be 6 or 7 OFDMA symbols. A logical resource unit (LRU) may be the basic logical unit for distributed and localized resource allocations. A LRU may be $P_{sc} \cdot N_{sym}$ subcarriers. The LRU may include pilot subcarriers, which are used in a PRU. The effective number of subcarriers in an LRU depends on the number of allocated pilots.

A distributed resource unit (DRU) may be a resource unit that contains a group of subcarriers that are spread across the distributed resource allocations within a frequency partition. In one embodiment, the size of the DRU equals the size of PRU, i.e., $P_{sc}$ subcarriers by $N_{sym}$ OFDMA symbols. In one embodiment, the minimum unit for forming the DRU may be equal to a pair of subcarriers, called tone-pair.

A localized resource unit or a contiguous resource unit (CRU) may be a resource unit that contains a group of subcarriers that are contiguous across the localized resource allocations. In one embodiment, the size of the CRU equals the size of the PRU, i.e., $P_{sc}$ subcarriers by $N_{sym}$ OFDMA symbols.

Downlink data transmission from a base station to a specific terminal or uplink data transmission from the specific terminal to the base station may be made through one or more LRUs. When the base station transmits data to the specific terminal, to the base station may identify to the terminal which one of the LRUs is used for data transmission. Also, in order to enable the specific terminal to transmit data, the base station may identify to the terminal which one of the LRUs is allowed to be used for data transmission.

Some data transmission schemes can be broadly classified as being one of a frequency diversity scheduling (FDS) scheme and a frequency selective scheduling (FSS) scheme. A FDS scheme is a scheme that obtains a reception performance gain using frequency diversity, and a FSS scheme is a scheme that obtains a reception performance gain using frequency selective scheduling.

In the FDS scheme, a transmitter transmits one data packet over subcarriers widely distributed in a system frequency domain so that symbols in the data packet can experience various radio channel fadings. Therefore, an improvement in reception performance is obtained by preventing the entire data packet from being subject to unfavorable fading. In contrast, in the FSS scheme, an improvement in reception performance is obtained by transmitting the data packet over one or more contiguous frequency areas in the system frequency domain which are in a favorable fading state.

In a cellular OFDMA wireless packet communication system, a plurality of terminals may be present in a cell. In this situation, because the radio channel conditions of the respective terminals may have different characteristics, it may be desirable to use the FDS scheme with respect to a first terminal and to use the FSS scheme with respect to a second terminal even within a subframe. Accordingly, a FDS scheme and a FSS scheme must be designed such that the two schemes can be efficiently multiplexed within a subframe.

In the FSS scheme, a gain can be obtained by selectively using a band favorable to a UE among all available bands, thus, evaluation of the condition of each band is required for the FSS scheme. In contrast, in the FDS scheme, an evaluation is not made as to whether a specific band is good or bad as long as a frequency separation capable of adequately obtaining diversity is maintained. Accordingly, overall system performance may be enhanced by performing the corresponding frequency selective scheduling of the FSS scheme preferentially when scheduling.

In the FSS scheme, because data is transmitted using subcarriers that are consecutively contiguous in the frequency domain, it is preferable that the data is transmitted using CRUs. At this time, provided that $N_{PRU}$ PRUs are present in one subframe and a maximum of $N_{CRU}$ CRUs are available within the system, the base station can transmit bitmap information of $N_{CRU}$ bits to each terminal to identify to the terminal which one of the CRUs will be used to transmit downlink data or which one of the CRUs will be used to transmit uplink data. It is possible that each bit of the $N_{CRU}$ bit bitmap information, which is transmitted to each terminal as scheduling information, indicates whether data will or can be transmitted through an CRU corresponding to this bit, among the $N_{CRU}$ CRUs. However, this scheme is disadvantageous in that, when the number $N_{CRU}$ becomes larger, the number of bits to be transmitted to each terminal becomes larger in proportion thereto.

Meanwhile, in a system adapting OFDMA scheme, subchannels may be mapped in accordance with one of a full usage of subchannel (FUSC) scheme, a partial usage of subchannel (PUSC) scheme, and an adaptive modulation and coding (AMC) scheme.

Among these three mapping schemes, the PUSC scheme relates to a method in which only a part of the entire system bandwidth is used at a time. In the PUSC scheme, available subcarriers are divided into subchannels. A subchannel contains pilot subcarriers at a predetermined location, and the remaining subcarriers are used for data transmission. For example, if a base station supports up to three sectors (alpha, beta, gamma), a PUSC scheme may segment all available subcarriers into three segmentations. If the entire system bandwidth is 10 MHz, the alpha sector may only use the first segmentation, the beta sector may only use the second segmentation, and the gamma sector may only use the third segmentation. When the subcarriers are orthogonal to each other, interference between sectors does not exist.

Figure 1:
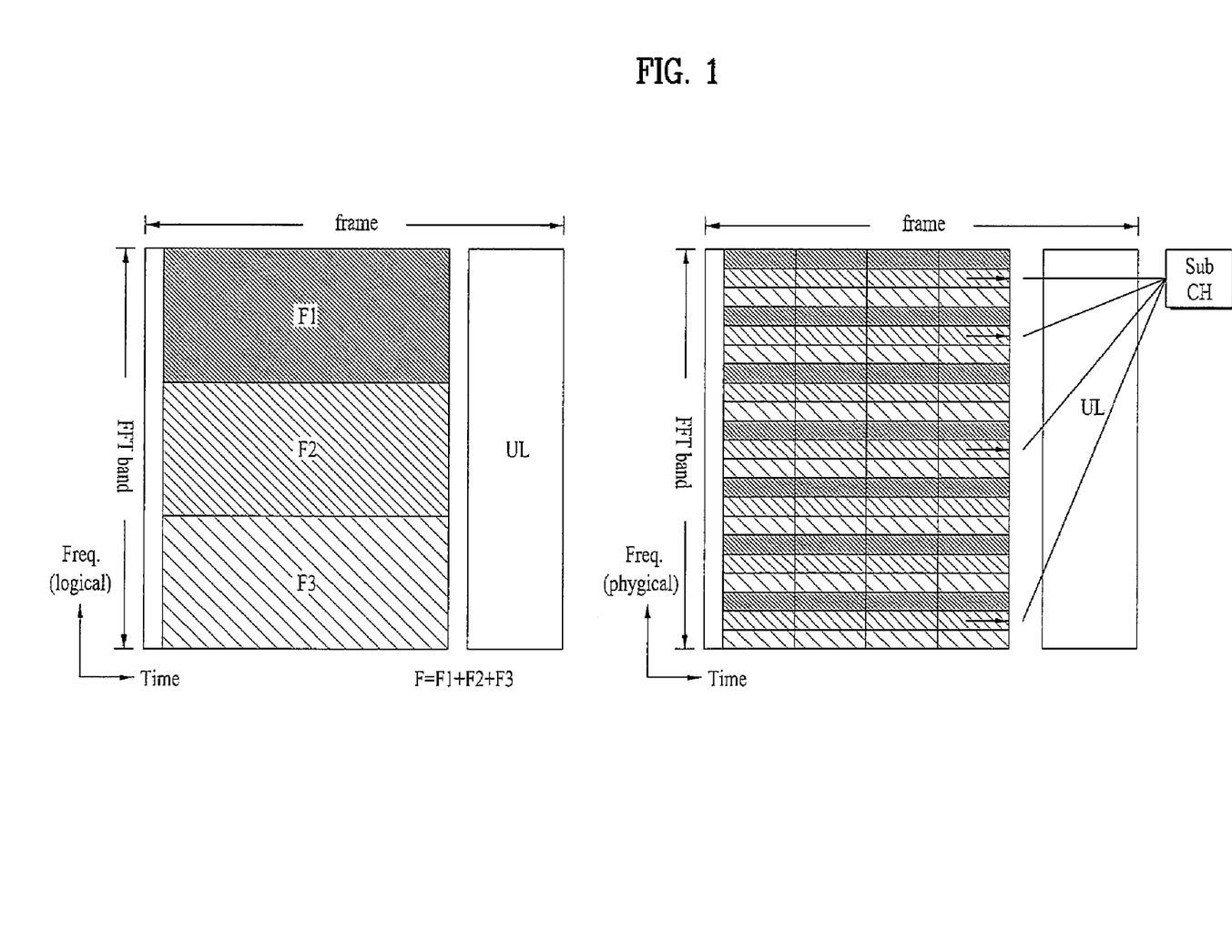
FIG. 1 shows an exemplary segmentation of time-frequency resources for PUSC (Partial Usage of Subchannel) wireless communications.

FIG. 1 shows an exemplary segmentation of time-frequency resources for PUSC method.

Referring to FIG. 1, the total frequency band is divided into 3 segments with one frequency band allocated to each sector of a cell with 3 sectors.

The described PUSC scheme can be extended to a flexible frequency reuse (FFR) scheme in a cellular system, which can increase cell capacity and quality of service of a user. With the FFR scheme, for example, the users located near the base station are provided a service using all available subcarriers, i.e., frequency reuse factor of 1, for maximizing cell capacity, whereas other users located at cell edges, who are expected to experience inter cell interferences, are provided a service using a subset of all available subcarriers, e.g., with a frequency reuse factor of 3, in order to reduce inter cell interferences.

Figure 2:
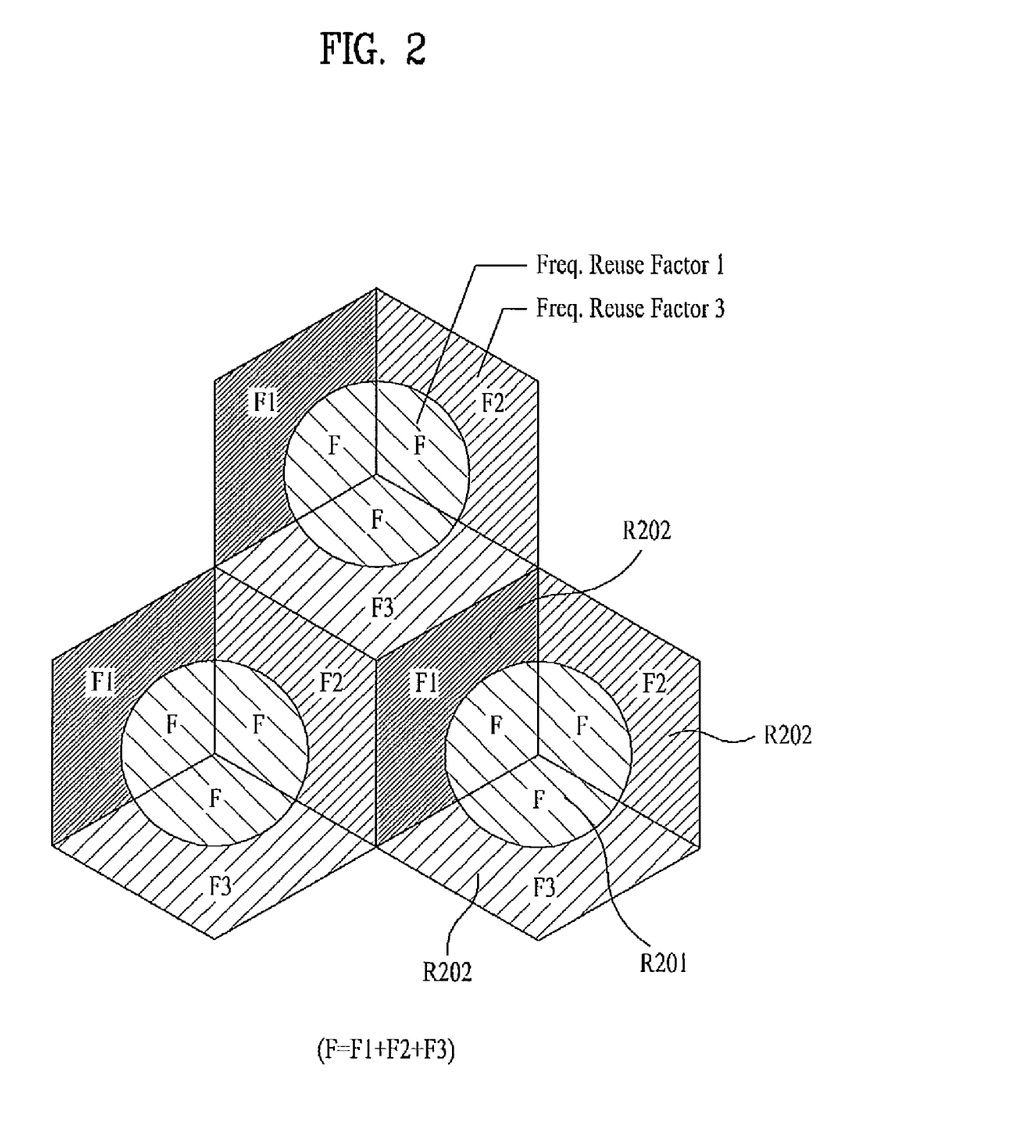
FIG. 2 shows an exemplary FFR (fractional frequency reuse) configuration in a cellular system.

FIG. 2 shows an exemplary FFR configuration in a cellular communication system.

Region R201 is a region where frequency reuse factor of 1 is used, and region R202 is a region where frequency reuse factor of 3 is used.

Single Granularities for Localized Permutation and Distributed Permutation

In one embodiment of the present invention, each subframe is divided into several frequency partitions in frequency domain; each partition includes a set of physical resource units across a total number of OFDMA symbols available in the subframe. Each frequency partition can include contiguous (localized) and/or non-contiguous (distributed) physical resource units. Each frequency partition can be used for FFR as mentioned above. Hereinafter, the features of the present invention will be explained in detail with reference to the accompanying drawings.

Figure 3:
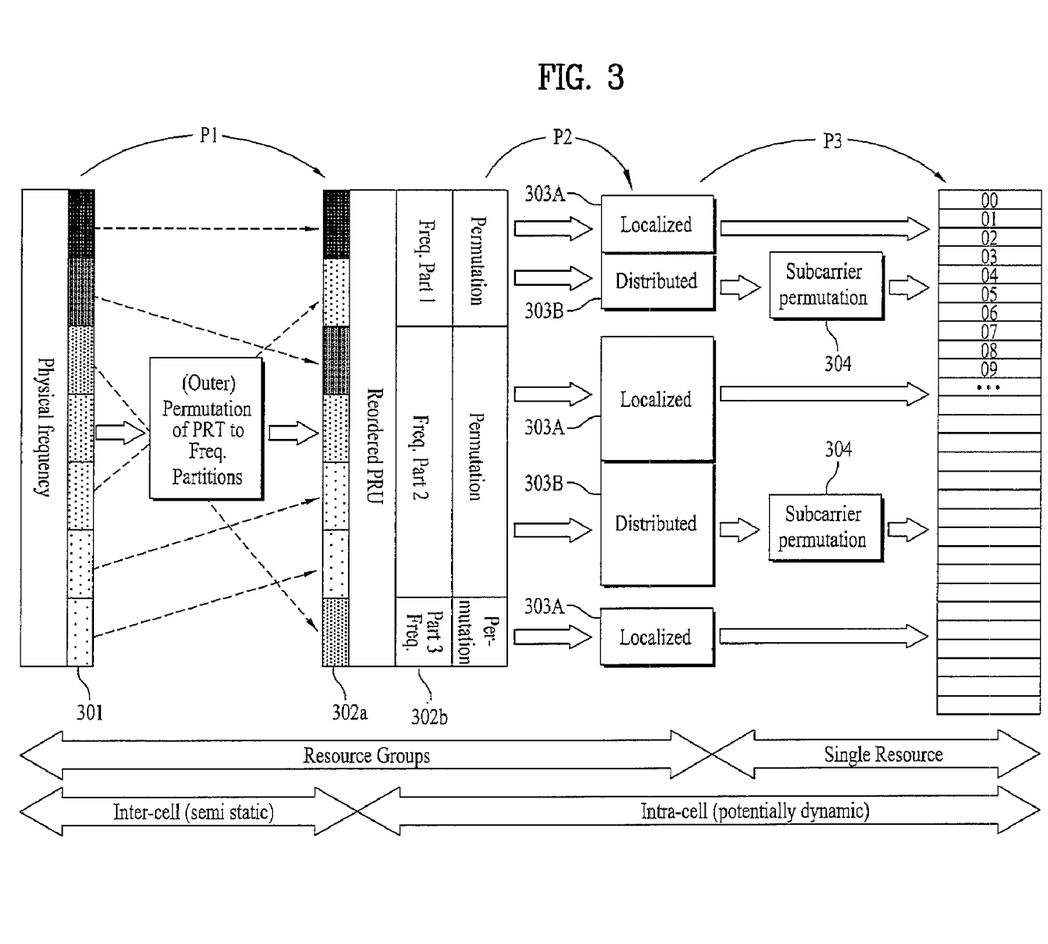
FIG. 3 is a conceptual diagram illustrating a subcarrier to resource mapping procedure according to an aspect of the present invention.

FIG. 3 is a conceptual diagram illustrating subcarrier to resource mapping procedure according to the present invention.

Referring to FIG. 3, block 301 represents a set of consecutive PRUs in a physical domain. The set of consecutive PRUs are first permuted to form a set of reordered PRUs 302A. Then, the set of reordered PRUs 302A are allocated to several frequency partitions as shown by 302B, for example a first frequency partition (Freq. Part 1), a second frequency partition (Freq. Part 2), a third frequency partition (Freq. Part 3). Each frequency partition may be reserved for the FFR group for each sector in a cell. In each frequency partition, a part of the reordered PRUs 302A is allocated for localized permutation 303A, in which resource units are reserved for contiguous resource mapping, and the remaining other part of the reordered PRUs 302A is allocated for distributed permutation 303B, in which resource units are reserved for distributed resource mapping. Then, the resource units can be distributed by subcarrier permutation 304.

As described above, subcarrier to resource mapping according to an embodiment of the present invention includes a first permutation of P1 of PRUs 301 onto reordered PRUs 302A, a second permutation P2 within each frequency partition, and a third permutation P3 in units of subcarriers. By the first permutation P1, the PRUs are distributed to each frequency partition. By the second permutation P2, the indexes of reordered PRUs are renumbered for each frequency partition. During the renumbering, PRUs may be distributed to localized resources or to distributed resources. By the third permutation P3, subcarriers are distributed to subchannels (LRU). Although the first permutation P1 and the second permutation P2 are performed in separation in the FIG. 3, the first permutation P1 and the second permutation P2 can be performed by a single process. Hereinafter, permutations comprised of the first permutation P1 and the second permutation P2 is referred to as "outer permutation" in this application so as to distinguish these permutations from the third permutation P3.

In an embodiment of the present invention, the total number of resource units constituting the entire system bandwidth may be 24 for a 5 MHz system bandwidth, 48 for a 10 MHz system bandwidth, and 96 for a 20 MHz system bandwidth. Each physical resource unit may be mapped to a corresponding frequency partition according to a predetermined permutation rule.

The outer permutation may be performed in units of N resource units. Herein, 'N' represents the minimum granularity for the outer permutation. For example, supposing that the system bandwidth is 10 MHz, and N equals 2, a total of 48 resource units RUs are contiguously paired into units of 2 RUs.

In this case, if the value N decreases, the minimum granularity of the outer permutation decreases such that diversity gain obtainable by the DRUs may increase. However, if the value N decreases and the signaling overhead is limited to a certain amount, band scheduling gain obtainable by the CRUs may decrease.

To the contrary, if the value N increases, the minimum granularity of the outer permutation increases. Additionally, in the case that signaling overhead is restricted to a certain amount, band scheduling gain obtainable by the CRUs may increase. However, in this case, diversity gain obtainable by the DRUs may decrease. In addition, the design of granularity of outer permutation may also be affected by pilot design pattern.

In conclusion, there is a trade-off between the advantageous effects of DRUs and CRUs, and it is needed to select the optimum granularity N of the outer permutation.

Hereinafter, design criteria will be described for setting N size of the outer permutation in detail according to the present invention.

First, because a system may support several bandwidths, it is preferable to determine the value N in connection with the supportable bandwidths so as to avoid a complicated formula for the outer permutation, or so as to restrict the number of formulas used for the outer permutation. By determining the value N in connection with the supportable bandwidths, the value N is a monotone increasing function of bandwidth. However, N does not have to be a monotone function of bandwidth.

Second, it is preferable to set the value N large enough not to decrease band scheduling gain obtainable by CRUs.

Third, it is preferable to set the value N small enough not to decrease diversity gain obtainable by DRUs.

Fourth, it is preferable to restrict the value N to the divisors of the total number of resource units for each supported bandwidth. For example, when the bandwidth is 5 MHz and the total number of resource units is 24, an allowable N number is one of 1, 2, 3, 4, 6, 8, and 12, when the bandwidth is 10 MHz and the total number of resource units is 48, an allowable N number is one of 1, 2, 3, 4, 6, 8, 12, 16, and 24, and when the bandwidth is 20 MHz and the total number of resource units is 96, an allowable N number is one of 1, 2, 3, 4, 6, 8, 12, 16, 24, 32, and 48. Optimally, the allowable N number is again restricted to one of 1, 2, 3, 4, 6, 8, and 12, considering the values are all available supported by bandwidths 5 MHz, 10 MHz, and 20 MHz.

Fifth, it is preferable to select the value N in relation to the total number F of the frequency partitions, on the condition that bandwidth of a frequency partition is the same as the bandwidth of another frequency partition. That is, the value N is a monotone decreasing function of F. Herein, the frequency partitions may correspond to FFR groups when FFR scheme is used. According to this design criterion, the following relations are obtained for the given conditions.

If F=1, then the number of resource units contained in each frequency partition is 24, 48, and 96 for bandwidth 5 MHz, 10 MHz, and 20 MHz, respectively.

If F=2, then the number of resource units contained in each frequency partition is 12, 24, and 48 for bandwidth 5 MHz, 10 MHz, and 20 MHz, respectively.

If F=3, then the number of resource units contained in each frequency partition is 8, 16, and 32 for bandwidth 5 MHz, 10 MHz, and 20 MHz, respectively.

If F=4, then the number of resource units contained in each frequency partition is 6, 12, and 24 for bandwidth 5 MHz, 10 MHz, and 20 MHz, respectively.

And if F=6, then the number of resource units contained in each frequency partition is 4, 8, and 16 for bandwidth 5 MHz, 10 MHz, and 20 MHz, respectively.

However, in the case that F exceeds 4, the number of resource units contained in each frequency partition becomes too small to obtain the advantageous effects provided by the CRUs or DRUs. Therefore, it is advantageous to set the F value to one of 1, 2, 3, and 4.

Last, it is preferable to determine the value N in relation to a diversity order. That is, the value N is optimally a monotone decreasing function of diversity order.

Supposing that a minimum of four (4) DRUs are determined to provide adequate diversity gain, an optimum value of N for the outer permutation can be obtained according to the combination of bandwidth and F by increasing the value N as much as possible for CRU band scheduling gain. Applying this rule for obtaining optimum combination of F and N for each bandwidth, optimum combinations of F and N are as follows:

For BW 5 MHz, $(F, N)=(2, 2), (3, 1), (4, 1)$

For BW 10 MHz, $(F, N)=(2, 4), (3, 2), (4, 2)$

For BW 20 MHz, $(F, N)=(2, 8), (3, 4), (4, 4)$ [Expression 1]

Based on the above results, an optimum value N for outer permutation is determined as follows:

$$N = k * f(24/F/D)$$ [Equation 1]

Herein, D may be a default value 4, which is a target diversity order obtainable by DRUs, the output of f(x) is a largest even number less than 'x', and k=1 for 5 MHz bandwidth, k=2, for 10 MHz bandwidth, and k=4 for 20 MHz bandwidth.

Equation 1 can be expressed as follows:

$N=2*k$ for $F=2$, $k=1, 2, 4$ for 5 MHz, 10 MHz, 20 MHz BW, respectively $N=k$ for $F=3$, $k=1, 2, 4$ for 5 MHz, 10 MHz, 20 MHz BW, respectively $N=k$ for $F=4$, $k=1, 2, 4$ for 5 MHz, 10 MHz, 20 MHz BW, respectively [Expression 2]

The above expressions assume that the bandwidth of a first frequency partition is the same as the bandwidth of another frequency partition. However, if the bandwidths of the frequency partitions are not the same to each other, the granularity N for outer permutation can be determined by considering the number of resource units of the frequency partition with the minimum bandwidth.

Different Granularities for Localized Permutation and Distributed Permutation

According to an embodiment of the present invention, after the outer permutation, resource regions for localized allocation and distributed allocation can be separately reserved. Alternatively, during the outer permutation, resource regions for localized allocation and distributed allocation can be separately reserved. In addition, as discussed above, larger granularity for outer permutation is more beneficial for localized permutation when considering both signaling overhead and band scheduling gain, and smaller granularity for outer permutation is more beneficial for distributed permutation when considering diversity gain. Optimal system performance may be achieved with a granularity value N_1 for localized permutation and another granularity value N_d for distributed permutation. Accordingly, it is possible to separately determine and use optimum granularities N_1 for localized permutation and N_d for distributed permutation by communicating in a system having an outer permutation in which granularities for distributed permutation and localized permutation are set to different values, respectively.

In an embodiment of the present invention, because CRUs and DRUs can be assigned individually for each frequency partitions for FFR, a set of N_1 and N_d can be individually assigned according to each frequency partition. The value of N_1 and/or N_d of each frequency partition is determined based on the characteristic of individual frequency partition.

According to an embodiment of the present invention, the optimum granularities N_1 and N_d are determined based on the characteristic of each frequency partition, especially when the frequency partition is reserved for FFR implementation.

The design criteria for separately setting N_1 for localized permutation and N_d for distributed permutation size is similar to the above described design criteria for setting N irrespective of permutation mode.

In the following paragraphs, an exemplary design criterion for setting N_1 and N_d of the outer permutation according to an embodiment of the present invention is described.

First, because a wireless communication system may support several bandwidths, it is preferable to determine the value N__1 and N_d in connection with the supportable bandwidths so as not to complicate a formula for outer permutation, or so as to restrict the number of formulas for outer permutation. Accordingly, each of the value N__1 and N_d is a monotone increasing function of bandwidth.

Second, it is preferable to determine the value of N__1 and N_d in consideration of the characteristics of each frequency partition, especially for FFR grouping. Because the degree of freedom for operating frequency bands or PRUs may be different for respective frequency groups (e.g., FFR group), N__1 and/or N_d of different frequency partitions (e.g., FFR groups) may have different values.

Third, for a certain frequency partition, for example, with frequency reuse factor of 1, it is preferable to set the value N large enough not to decrease band scheduling gain obtainable by CRUs, and, at the same time, small enough not to decrease diversity gain obtainable by DRUs. That is, N__1 can be set to a value that is of benefit to CRUs, and N_d can be set to a value that is of benefit to DRUs.

Fourth, for a certain frequency partition, for example, with frequency reuse factor of K (K>1), it is preferable to set the value N as small as possible because, for a sector of reuse factor K (K>1), the degrees of freedom of assigning frequency bands or PRUs are small, and because interference mitigation between cells or sectors should be considered. Therefore, it is preferable to set both N__1 and N_d to a small value.

Fifth, it is preferable to restrict the value N to the divisors of the total number of resource units for each supported bandwidth. For example, if the bandwidth is 5 MHz and the total number of resource units is 24, then the allowable N number is one of 1, 2, 3, 4, 6, 8, and 12. If the bandwidth is 10 MHz and the total number of resource units is 48, then the allowable N number is one of 1, 2, 3, 4, 6, 8, 12, 16, and 24. If the bandwidth is 20 MHz and the total number of resource units is 96, then the allowable N number is one of 1, 2, 3, 4, 6, 8, 12, 16, 24, 32, and 48. Accordingly, the allowable N number is again restricted to one of 1, 2, 3, 4, 6, 8, and 12, considering all available supported bandwidth of 5 MHz, 10 MHz, and 20 MHz.

Sixth, it is preferable to select the value N in relation to the total number F of the frequency partitions, on the condition that bandwidth of a frequency partition is the same as the bandwidth of another frequency partition (that is, when the value N is a monotone decreasing function of F). Herein, the frequency partitions may correspond to FFR groups when FFR scheme is used. According to this design criterion, the following relations are obtained for the given conditions.

If F=1, then the number of resource units contained in each frequency partition is 24, 48, and 96 for bandwidth 5 MHz, 10 MHz, and 20 MHz, respectively.

If F=2, then the number of resource units contained in each frequency partition is 12, 24, and 48 for bandwidth 5 MHz, 10 MHz, and 20 MHz, respectively.

If F=3, then the number of resource units contained in each frequency partition is 8, 16, and 32 for bandwidth 5 MHz, 10 MHz, and 20 MHz, respectively.

If F=4, then the number of resource units contained in each frequency partition is 6, 12, and 24 for bandwidth 5 MHz, 10 MHz, and 20 MHz, respectively.

And if F=6, then the number of resource units contained in each frequency partition is 4, 8, and 16 for bandwidth 5 MHz, 10 MHz, and 20 MHz, respectively.

However, in the case that F exceeds 4, the number of resource units contained in each frequency partition becomes too small to obtain the advantageous effects by CRUs or DRUs. Therefore, it is preferable to set the F value to one of 1, 2, 3, and 4.

Last, it is preferable to determine the value N in relation to diversity order in relation to DRUs. That is, the value N is preferably a monotone decreasing as a function of diversity order.

Hereinafter, details of how to determine optimum value of N__1 and N_d will be explained for the frequency partition of frequency reuse factor 1.

It is assumed that bandwidth is one of 5 MHz, 10 MHz, and 20 MHz, although other bandwidths are possible, and that at least 3 or 4 of DRUs are required to achieve diversity order 3 or 4 for frequency reuse factor 1, although other values are possible. An optimum value of N for the outer permutation can be obtained according to the bandwidth and the number F of frequency partitions by increasing the value of N as much as possible. Applying this rule for obtaining the optimum N for each combination of F and bandwidth, combinations of F and N are given as follows:

$$\text{For BW 5 MHz, } (F, N)=(2, 2), (3, 2), (4, 1)$$

$$\text{For BW 10 MHz, } (F, N)=(2, 4), (3, 3), (4, 2)$$

$$\text{For BW 20 MHz, } (F, N)=(2, 8), (3, 4), (4, 4) \quad\quad \text{[Expression 3]}$$

N__1 and N_d can be selected from the above numerated values of N under certain criterion.

If both N__1 and N_d are determined for each bandwidth, the maximum N is selected as N__1 and the minimum N is selected as N_d as follows:

$$\text{For BW 5 MHz, } (F, N)=(2, \underline{2}), (3, 2), (4, \underline{1})$$

$$\text{For BW 10 MHz, } (F, N)=(2, \underline{4}), (3, 3), (4, \underline{2})$$

$$\text{For BW 20 MHz, } (F, N)=(2, \underline{8}), (3, 4), (4, \underline{4}) \quad\quad \text{[Expression 4]}$$

Expression 4 is a rewritten form of Expression 3 in order to emphasize the minimum N and the maximum N for each bandwidth by bold underlining the proper values. Accordingly, (N__1, N_d)=(2, 1) for BW 5 MHz, (N__1, N_d)=(4, 2) for BW 10 MHz, and (N__1, N_d)=(8, 4) for BW 20 MHz. If 'N' is set to have a constant value irrespective of bandwidth for a system having both a partition with frequency reuse factor 1 and an another partition with frequency reuse factor 3, the maximum value of 4 from Expression 4 is selected as an optimum N__1 and the minimum value of 1 from Expression 4 is selected an optimum N_d for the case of F=4.

In another embodiment, N__1 can be determined according to bandwidth, while N_d is fixed to 1 irrespective of bandwidth for DRU diversity gain. In this case, the maximum value of N is selected as N__1 for each bandwidth as follows:

$$\text{For BW 5 MHz, } (F, N)=(2, \underline{2}), (3, 2), (4, 1)$$

$$\text{For BW 10 MHz, } (F, N)=(2, \underline{4}), (3, 3), (4, 2)$$

$$\text{For BW 20 MHz, } (F, N)=(2, \underline{8}), (3, 4), (4, 4) \quad\quad \text{[Expression 5]}$$

Expression 5 is a rewritten form of Expression 3 in order to emphasize the maximum N of each bandwidth by bold underlining the proper values. Accordingly, (N__1, N_d)=(2, 1) for BW 5 MHz, (N__1, N_d)=(4, 1) for BW 10 MHz, and (N__1, N_d)=(8, 1) for BW 20 MHz. If 'N' is set to have a constant value irrespective of bandwidth for a system having both a partition with frequency reuse factor 1 and an another partition with frequency reuse factor 3, the value of 4 from Expression 5 is selected as an optimum N__1 in consideration of the maximum bandwidth of 20 MHz.

In another embodiment, N__1 can be determined according to bandwidth, but targeting F=3 more than F=2, while N_d is fixed to 1 irrespective of bandwidth for DRU diversity gain. In this case, the N obtained when F=3 is selected as N__1 for each bandwidth, as follows:

For BW 5 MHz, (F, N)=(2, 2), (3, $\underline{2}$), (4, 1)

For BW 10 MHz, (F, N)=(2, 4), (3, $\underline{3}$), (4, 2)

For BW 20 MHz, (F, N)=(2, 8), (3, $\underline{4}$), (4, 4)  [Expression 6]

Expression 6 is a rewritten form of Expression 3 in order to emphasize the N with F=3 of each bandwidth by bold underlining the proper values. Accordingly, (N__1, N_d)=(2, 1) for BW 5 MHz, (N__1, N_d)=(3, 1) for BW 10 MHz, and (N__1, N_d)=(4, 1) for BW 20 MHz. If 'N' is set to have a constant value irrespective of bandwidth, the value of 4 from Expression 6 is selected as an optimum N__1 in consideration of the maximum bandwidth of 20 MHz.

In another embodiment, N__1 can be determined according to a bandwidth having a linear increase, while N_d is fixed to 1 irrespective of bandwidth for DRU diversity gain. In this case, the N obtained with F=3 is selected as N__1 for each bandwidth, as follows:

For BW 5 MHz, (F, N)=(2, 2), (3, $\underline{2}$), (4, 1)

For BW 10 MHz, (F, N)=(2, 4), (3, $\underline{3}$), (4, 2)

For BW 20 MHz, (F, N)=(2, 8), (3, $\underline{4}$), (4, 4)  [Expression 7]

Expression 7 is a rewritten form of Expression 3 in order to emphasize the N with F=1 of each bandwidth by bold underlining the proper values. Accordingly, (N__1, N_d)=(1, 1) for BW 5 MHz, (N__1, N_d)=(2, 1) for BW 10 MHz, and (N__1, N_d)=(4, 1) for BW 20 MHz. From Expression 7, if 'N' is set to have a constant value irrespective of bandwidth, the value of (4, 1) is selected as an optimum value set (N__1, N_d) in consideration of the maximum bandwidth.

Hereinafter, details of how to decide optimum value of N__1 and N_d will be explained for a system having a frequency partition with a frequency reuse factor K (K>1).

It is assumed that bandwidth is one of 5 MHz, 10 MHz, and 20 MHz, although other bandwidths are possible. For a sector having a frequency reuse factor K (K>1), because the degree of freedom for allocating frequency bands or PRUs is relatively small and interference mitigation between cells or sectors is needed to be considered, smaller granularities are more preferable to the granularities used for frequency reuse factor 1.

According to one example of the present invention, the value of optimum N__1 and N_d are set to 1 irrespective of bandwidth as follows:

For BW 5 MHz: N__1=1, N_d=1

For BW 10 MHz: N__1=1, N_d=1

For BW 20 MHz: N__1=1, N_d=1  [Expression 8]

According to another example of the present invention, the value of an optimum N__1 is set according to bandwidth, but N_d is set to 1 irrespective of bandwidth as follows:

For BW 5 MHz: N__1=2, N_d=1

For BW 10 MHz: N__1=3, N_d=1

For BW 20 MHz: N__1=4, N_d=1  [Expression 9]

According to still another example of the present invention, the value of optimum N__1 is set according to a bandwidth having a linear increase, but N_d is set to 1 irrespective of bandwidth as follows:

For BW 5 MHz: N__1=1, N_d=1

For BW 10 MHz: N__1=2, N_d=1

For BW 20 MHz: N__1=4, N_d=1  [Expression 10]

According to one embodiment of the present invention, it is presumed that the granularity for localized permutation is N__1 and the granularity for distributed permutation is N_d. In this case, the formula for the outer permutation is a variable function of the number of users or RUs supporting each permutation mode, N__1 and N_d, and the number F of frequency partitions. In one example, the frequency partitions may correspond to FFR groups when FFR scheme is used. This function can be represented as follows:

Outer permutation rule=$f$(# of user (RU) for localized permutation, # of user (RU) for distributed permutation, N__d, N__1, # of FFR group)  [Equation 2]

It can be the case that the number of RUs per FFR group and/or permutation mode is further required as one of independent variables for Equation 2.

It is preferable to design an outer permutation rule so that the number of CRUs (DRUs) between DRUs (CRUs) becomes a multiple of N_I (N_d). For example, in the case that an additional granularity of N_c is required for control region, N_c also can be taken into consideration when designing outer permutation.

Figure 4:
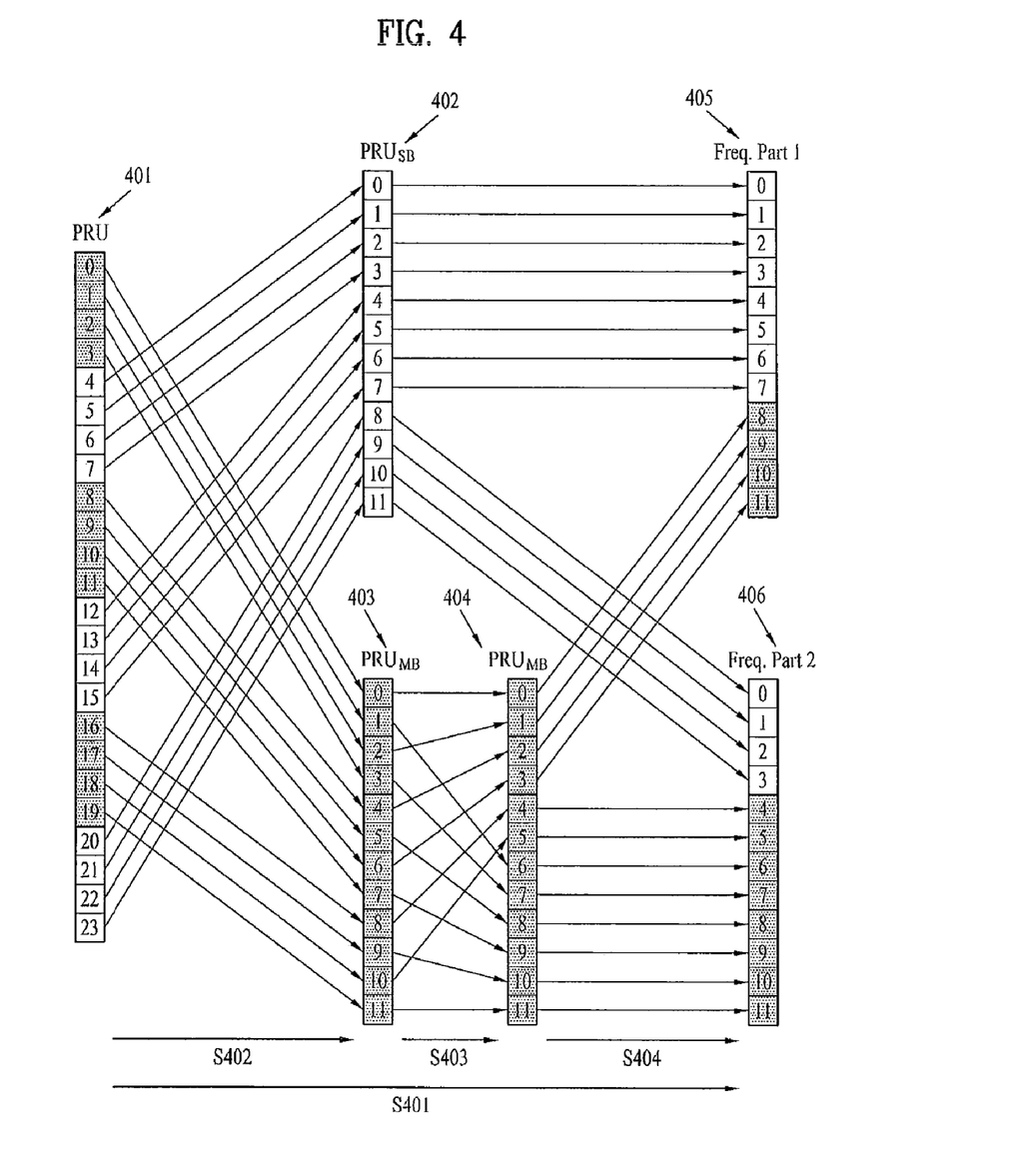
FIG. 4 is an exemplary diagram of frequency partitioning according to an aspect of the present invention.

FIG. 4 is an exemplary diagram of frequency partitioning according to the present invention.

Referring to FIG. 4, 'PRU' 401 represents a group of physical resource units arranged in physical frequency axis, 'PRU$_{SB}$' 402 represents a group of resource units for CRUs (called as a sub-band), 'PRU$_{MB}$' 403 represents a group of resource units for DRUs (called as a mini-band), 'PRU$_{MB}$' 404 represents rearrange group of resource units for DRUs (called as a second mini-band), 'Freq. Part 1' 405 represents a first frequency partition according to the present invention, and 'Freq. Part 2' 406 represents a second frequency partition according to the present invention. The resource units in 'PRU' 401 are regrouped into 'PRU$_{SB}$' 402 and 'PRU$_{MB}$' 403 by the step of S402. The resource units in 'PRU$_{MB}$' 403 are permuted in units of a resource unit by the step of S403. The resource units in 'PRU$_{SB}$' 402 and 'PRU$_{MB}$' 404 are mapped to corresponding frequency partitions by the step of S404.

According to FIG. 4, the granularity for CRUs is 4, and the granularity for DRUs is 1. Eventually, the resource units in 'PRU' 401 are partitioned into frequency partitions 'Freq. Part 1' 405 and 'Freq. Part 2' 406. The algorithms for internal steps S402, S403, and S404 may change according to implementation.

In FIG. 4, there are two frequency partitions 405 and 406. However, it is possible to have 3 or more frequency partitions. Also, FIG. 4 shows the last 4 PRUs of the sub-band being mapped to the second frequency partition. In other embodiments, a different 4 PRUs of the sub-band may be mapped. These 4 PRUs may or may not be contiguous. Also, FIG. 4 shows the first 4 PRUs of the remapped mini-band being mapped to the first frequency partition. In another embodiment, different PRUs of the remapped mini-band may be mapped to the first frequency partition. Indeed, any one or more contiguous or non-contiguous PRUs of the remapped mini-band can be mapped to one or another frequency partition.

According to one embodiment of the present invention, physical resource units (PRUs) are partitioned into different frequency partitions, and then permutation of subcarriers in each partition is performed.

Figure 5:
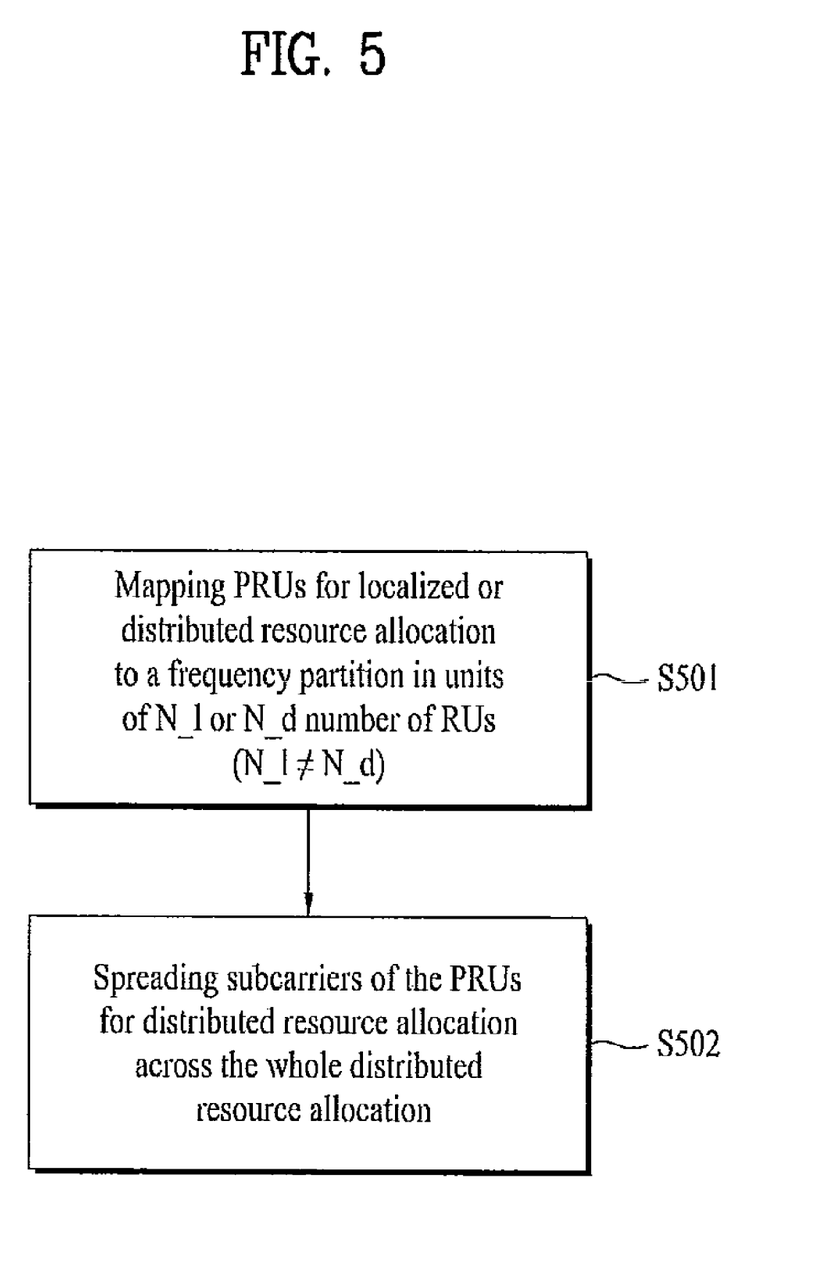
FIG. 5 shows an exemplary method for permuting subcarriers in a subframe that is divided into more than one frequency partitions according to one embodiment of the present invention.

FIG. 5 shows an exemplary method for permuting subcarriers in a subframe which is divided into more than one frequency partition according to one embodiment of the present invention.

In step 501, PRUs for localized resource allocation are mapped to a frequency partition in units of N_1 number of resource units, and PRUs for distributed resource allocation are mapped to the frequency partition in units of N_d number of resource units (N_1≠N_d). In this case, preferably, N_1 equals 4 and N_d equals 1 according to the above described Expressions 1 to 10. Then, in step 502, the subcarriers of the PRUs for distributed resource allocation in the frequency partition are spread across the whole distributed resource allocations. In this case, it is preferable that the subcarriers are spread with the granularity of a pair of subcarriers.

According to an embodiment of the present invention, when a region for a control signal is necessary, the region can be reserved separately from the above discussed frequency partitions. In this case, the above described features of the present invention can be applied to the resources excluding those regions reserved for the control signal.

Figure 6:
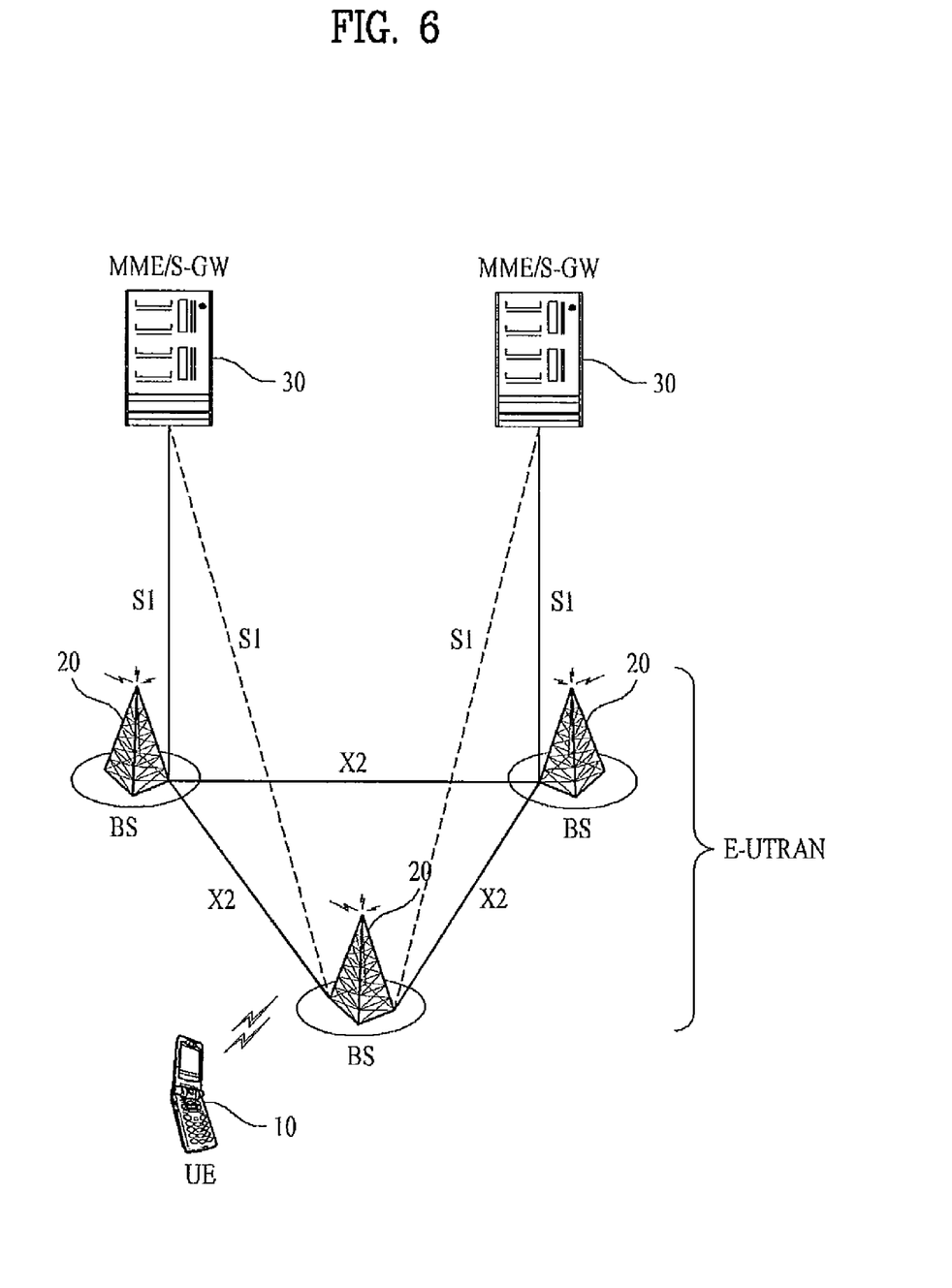
FIG. 6 shows a structure of a wireless communication system adapted to operate in accordance with at least one of FIG. 3, FIG. 4, and FIG. 5.

FIG. 6 shows a structure of a wireless communication system capable for which the present invention is applicable including the method of FIG. 3, FIG. 4, and FIG. 5. The wireless communication system may have a network structure of an evolved-universal mobile telecommunications system (E-UMTS). The E-UMTS may also be referred to as a long term evolution (LTE) system. The wireless communication system can be widely deployed to provide a variety of communication services, such as voices, packet data, etc.

Referring to FIG. 6, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. Hereinafter, a downlink is defined as a communication link from the BS 20 to the UE 10, and an uplink is defined as a communication link from the UE 10 to the BS 20.

The BSs 20 are interconnected by means of an X2 interface, The BSs 20 are also connected by means of an S1 interface to an evolved packet core (EPC), more specifically, to a mobility management entity (MME)/serving gateway (S-GW) 30. The S1 interface supports a many-to-many relation between the BS 20 and the MME/S-GW 30.

Figure 7:
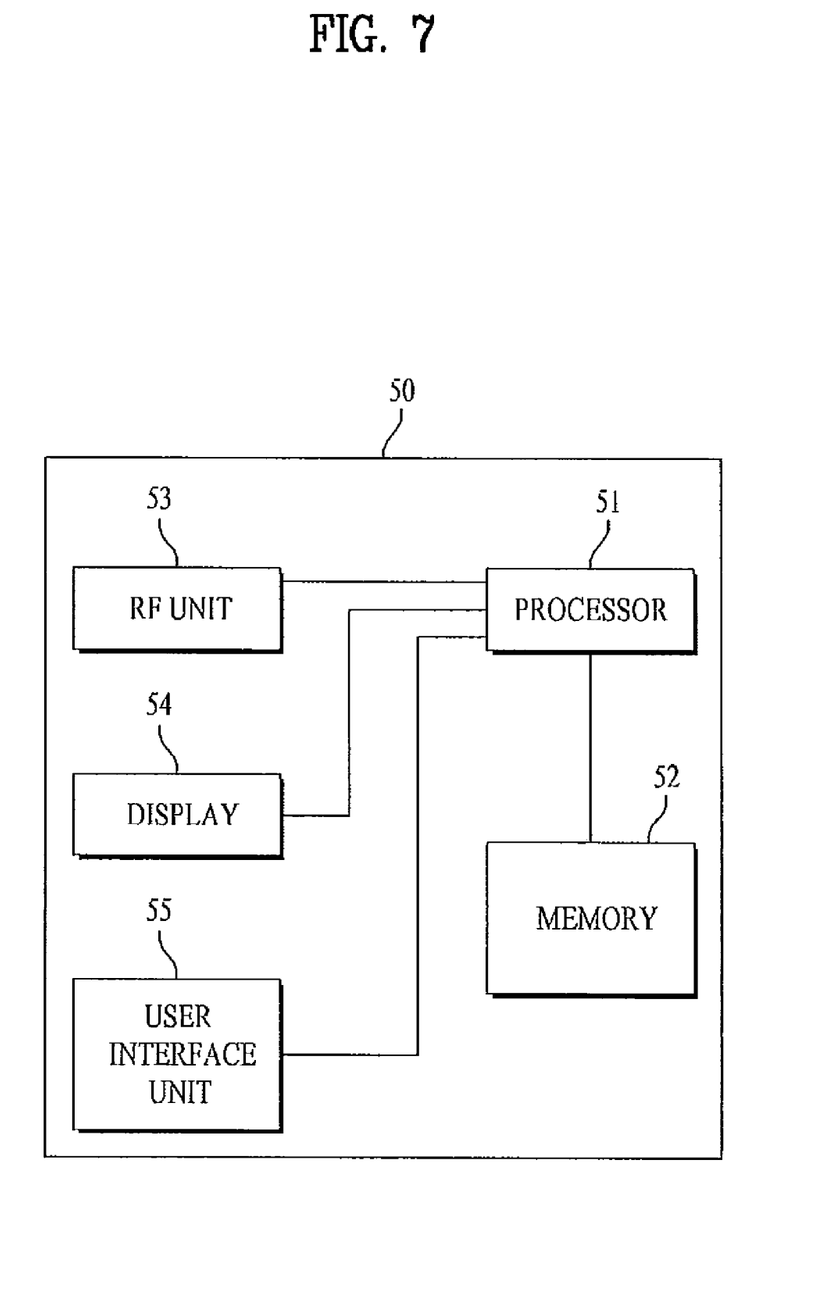
FIG. 7 is a block diagram showing constitutional elements of a device 50, that can be either the UE or the BS of FIG. 6, and adapted to operate in accordance with at least one of FIG. 3, FIG. 4, and FIG. 5.

FIG. 7 is a block diagram showing constitutional elements of a device 50, that can be either the UE or the BS of FIG. 6, and that can perform the methods of FIG. 3, FIG. 4, and FIG. 5. Device 50 includes a processor 51, a memory 52, a radio frequency (RF) unit 53, a display unit 54, and a user interface unit 55. Layers of the radio interface protocol are implemented in the processor 51. The processor 51 provides the control plane and the user plane. The function of each layer can be implemented in the processor 51. The processor 51 may also include a contention resolution timer. The memory 52 is coupled to the processor 51 and stores an operating system, applications, and general files. If device 50 is a UE, the display unit 54 displays a variety of information and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between the UE and the network can be classified into a first layer (L1), a second layer (L2), and a third layer (L3) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention is applicable to a wireless mobile communication device used for a cellular system.

What is claimed is:

1. A method of transmitting a signal at a communication apparatus, comprising:
   partitioning, by the communication apparatus, physical resource units (PRUs) into two groups, the two groups including sub-band PRUs for a frequency selective allocation, and first mini-band PRUs for a frequency diverse allocation;
   permuting, by the communication apparatus, the first mini-band PRUs and mapping the permuted first mini-band PRUs into second mini-band PRUs; and
   allocating, by the communication apparatus, the sub-band PRUs and the second mini-band PRUs to at least one frequency partition,
   wherein the second mini-band PRUs are located behind the sub-band PRUs in each of the at least one frequency partition, and
   wherein the at least one frequency partition is used for fractional frequency reuse (FFR).

2. The method of claim 1,
   wherein a total number of the PRUs is one of 24, 48 and 96,
   wherein the partitioning step includes mapping the PRUs into the sub-band PRUs and the first mini-band PRUs in units of contiguous PRUs, and
   wherein a number of PRUs in the units of contiguous PRUs is 4.

3. The method of claim 2, wherein the step of partitioning includes:
   mapping a first, third and fifth unit of 4 contiguous PRUs to the first mini-band PRUs; and
   mapping a second, fourth and sixth unit of 4 contiguous PRUs to the sub-band PRUs.

4. The method of claim 1, wherein the step of mapping the PRUs of the mini-band includes: mapping a first, third, fifth, seventh, ninth and eleventh units of the first mini-band PRUs into a first half of the second mini-band PRUs; and
   mapping a second, fourth, sixth, eighth, tenth and twelfth units of the first mini-band PRUs into a second half of the second mini-band PRUs.

5. The method of claim 1, further comprising:
transmitting the signal over the at least one frequency partition.

6. The method of claim 1,
wherein the at least one frequency partition includes a contiguous resource unit (CRU) and a distributed resource unit (DRU), and
wherein the method further comprises:
allocating, by the communication apparatus, a part of the PRUs in each of the at least one frequency partition to the CRU and the remaining other part of the PRUs to the DRU; and
spreading, by the communication apparatus, subcarriers of the PRUs in the DRU across whole distributed resource allocations.

7. A device configured to transmit a signal, comprising:
a memory;
a radio frequency (RF) transceiver;
a display;
a user interface; and
a processor operatively connected to the memory, the RF transceiver, the display and the user interface, the processor configured to:
partition physical resource units (PRUs) into two groups, the two groups including sub-band PRUs for a frequency selective allocation and first mini-band PRUs for a frequency diverse allocation;
permute the first mini-band PRUs and map the permuted first mini-band PRUs into second mini-band PRUs; and
allocate the sub-band PRUs and the second mini-band PRUs to at least one frequency partition,
wherein the second mini-band PRUs are located behind the sub-band PRUs in each of the at least one frequency partition, and
wherein the at least one frequency partition is used for fractional frequency reuse (FFR).

8. The device of claim 7, wherein a total number of the PRUs is one of 24, 48 and 96,
wherein the processor configured to map the PRUs into the sub-band PRUs and the first mini-band PRUs in units of contiguous PRUs, and
wherein a number of PRUs in the units of contiguous PRUs is 4.

9. The device of claim 8, wherein the processor is configured to map a first, third and fifth unit of 4 contiguous PRUs to the first mini-band PRUs, and map a second, fourth and sixth unit of 4 contiguous PRUs to the sub-band PRUs.

10. The device of claim 7, wherein the processor is configured to map a first, third, fifth, seventh, ninth and eleventh units of the first mini-band PRUs into a first half of the second mini-band PRUs, and map a second, fourth, sixth, eighth, tenth and twelfth units of the first mini-band PRUs into a second half of the second mini-band PRUs.

11. The device of claim 7, wherein the processor is further configured to control the RF transceiver to transmit the signal over the at least one frequency partition.

12. The device of claim 7, wherein the device is a mobile communication device configured to wirelessly communicate with a base station.

13. The device of claim 7, wherein the device is a base station configured to wirelessly communicate with a mobile device.

14. The device of claim 7,
wherein the at least one frequency partition includes a contiguous resource unit (CRU) and a distributed resource unit (DRU), and
wherein the processor is further configured to:
allocate a part of the PRUs in each of the at least one frequency partition to the CRU and the remaining other part of the PRUs to the DRU, and
spread subcarriers of the PRUs in the DRU across whole distributed resource allocations.

* * * * *